United States Patent
Muraleedharan et al.

(10) Patent No.: US 11,231,967 B2
(45) Date of Patent: Jan. 25, 2022

(54) DYNAMICALLY ALLOCATING AND MANAGING CLOUD WORKERS

(71) Applicant: STRATUM, LLC, Phoenix, AZ (US)

(72) Inventors: Narendran Muraleedharan, Scottsdale, AZ (US); Clayton Brown, Scottsdale, AZ (US)

(73) Assignee: STRATUM, LLC, Phoenix, AZ (US)

( * ) Notice: Subject to any disclaimer, the term of this patent is extended or adjusted under 35 U.S.C. 154(b) by 73 days.

(21) Appl. No.: 16/853,371

(22) Filed: Apr. 20, 2020

(65) Prior Publication Data

US 2021/0326184 A1 Oct. 21, 2021

(51) Int. Cl.
*G06F 9/50* (2006.01)
*G06F 21/53* (2013.01)

(52) U.S. Cl.
CPC .......... *G06F 9/5072* (2013.01); *G06F 9/5005* (2013.01); *G06F 21/53* (2013.01)

(58) Field of Classification Search
CPC ........ G06F 9/5072; G06F 9/547; G06F 21/53; G06F 9/5005
See application file for complete search history.

(56) References Cited

U.S. PATENT DOCUMENTS

| | | | |
|---|---|---|---|
| 2010/0198972 A1* | 8/2010 | Umbehocker | G06F 9/5016 709/226 |
| 2013/0247034 A1* | 9/2013 | Messerli | G06F 9/45533 718/1 |
| 2014/0059226 A1* | 2/2014 | Messerli | H04L 47/783 709/226 |
| 2015/0264122 A1* | 9/2015 | Shau | G06F 9/5088 709/203 |
| 2018/0084034 A1* | 3/2018 | Stelmar Netto | H04L 67/1002 |
| 2018/0181439 A1* | 6/2018 | Jackson | G06F 9/5005 |
| 2018/0321993 A1* | 11/2018 | McClory | G06F 8/41 |
| 2020/0012526 A1* | 1/2020 | Bianchini | G06F 9/45558 |
| 2020/0076685 A1* | 3/2020 | Vaidya | G06F 9/45558 |
| 2020/0218580 A1* | 7/2020 | Kim | G06F 9/5077 |

* cited by examiner

*Primary Examiner* — Benjamin C Wu
(74) *Attorney, Agent, or Firm* — Weiss & Moy, P.C.; Jeffrey D. Moy

(57) ABSTRACT

A cloud worker management system has a worker management unit. The worker management unit manages a plurality of cloud workers. The worker management unit dynamically allocates and manages deployment of the cloud workers to a plurality of servers. A request handling unit communicates with the worker management unit. The request handling unit receives job request, creates a job data structure object for the job request and forwards the job request with the job data structure object to an available cloud worker. A user interface allows users of the system to view and edit job statutes; track jobs; monitor status, load and operating parameters of each cloud worker; set and change rules for cloud worker and server deployments, and perform analytics on job results.

25 Claims, 6 Drawing Sheets

DYNAMICALLY ALLOCATING AND MANAGING CLOUD WORKERS

TECHNICAL FIELD

The present application generally relates to cloud computing and, more particularly, to a dynamic allocation and resource management system for cloud workers that may keep the required servers up and enabled only when needed, saving users money on server rentals during off hours.

BACKGROUND

Cloud computing is the on-demand availability of computer system resources, especially data storage and computer power, without direct active management by the user. The term is generally used to describe data centers available to many users over the Internet. Large clouds, predominant today, often have functions distributed over multiple locations from central servers. Clouds may be limited to a single organization (enterprise clouds), or be available to many organizations (public cloud).

Cloud computing relies on sharing of resources to achieve coherence and economies of scale. Cloud computing may allow companies to avoid or minimize up-front IT infrastructure costs. Cloud computing may allow companies to get their applications up and running faster, with improved manageability and less maintenance, and it may enable IT teams to more rapidly adjust resources to meet fluctuating and unpredictable demand.

Many business and operational processes such as document data extraction, image processing, compression, video rendering, speech-to-text conversion, machine learning predictions and the like can be packaged as compartmentalized or containerized software programs. These programs (henceforth referred to as cloud workers) may be deployed on servers hosted either on dedicated or shared machines, or through server management systems such as Amazon Web Services, Microsoft Azure, Google Cloud Platform, Packet, Vultr and the like.

Cloud workers may be designed to perform specific tasks on demand or from a queue. Businesses may rent servers from providers to host their cloud workers, paying for periods of times servers are deployed. In order to handle traffic (number of requests to perform tasks), businesses may need to deploy multiple servers, and/or multiple instances of cloud workers. Many times, businesses may not need to serve heavy traffic during off hours however continue to pay for server rentals.

The tasks performed by the cloud workers may be quick and take a few milliseconds, or may require heavy computational resources and take minutes to days. Thus, knowledge of request inputs, outputs, sources, times, and processing requirements, allow businesses to gather valuable insights into usage and make high level business decisions. Presently, there is not a system that provides this type of information.

Therefore, it would be desirable to provide a system and method that overcome the above problems.

SUMMARY

In accordance with one embodiment, a cloud worker management system is disclosed. The cloud worker management system has a worker management unit. The worker management unit manages a plurality of cloud workers. The worker management unit dynamically allocates and manages deployment of the cloud workers to a plurality of servers. A request handling unit communicates with the worker management unit. The request handling unit receives job request, creates a job data structure object for the job request and forwards the job request with the job data structure object to an available cloud worker. A user interface allows users of the system to view and edit job statutes; track jobs; monitor status, load and operating parameters of each cloud worker; set and change rules for cloud worker and server deployments, and perform analytics on job results.

BRIEF DESCRIPTION OF THE DRAWINGS

The present application is further detailed with respect to the following drawings. These figures are not intended to limit the scope of the present application but rather illustrate certain attributes thereof. The same reference numbers will be used throughout the drawings to refer to the same or like parts.

DESCRIPTION OF THE APPLICATION

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

Embodiments of the exemplary dynamic allocation and resource management system for cloud workers (hereinafter system) may keep required servers up and enabled generally only when needed, saving users money on server rentals during off hours. The system may use dynamic scheduling, machine learning, artificial intelligence, and predictive modeling on customers' server usage history to optimize server run times. The system may use current/active traffic data in real-time to manage and allocate server resources to cloud workers. The system may dynamically turn on, shut off, create, deploy, delete, and reserve servers depending on both predicted usage, and current request volume/traffic.

The system may provide a user interface which may allow customers to track, analyze, and study request volumes, resources, inputs, and outputs for each of their cloud workers. The user interface can also be used to set rules regarding fixed server on/off times (for example, to match business hours), intelligence optimization parameters (delays, minimum workers etc.), and other preferences that aid in optimal performance. The system may track worker inputs and outputs in a manner that may allow the entire worker to potentially be replaced by a high-performance artificial intelligence software—with sufficient number of requests made, and data gathered. The artificial intelligence software may be able to perform image processing tasks, data extraction tasks, and possibly any task that may be deployed on the system. High performance artificial intelligence and deep learning algorithms may require significantly smaller amounts of time to compute as opposed to conventional and logical algorithms. For example, a 512×512 pixel image flood fill may take up to 1 second using conventional seed fill algorithms, but may be performed in less than 10 milliseconds using deep learning. Quicker computation with fewer computational resources may further lower the total server rental cost.

Figure 1:
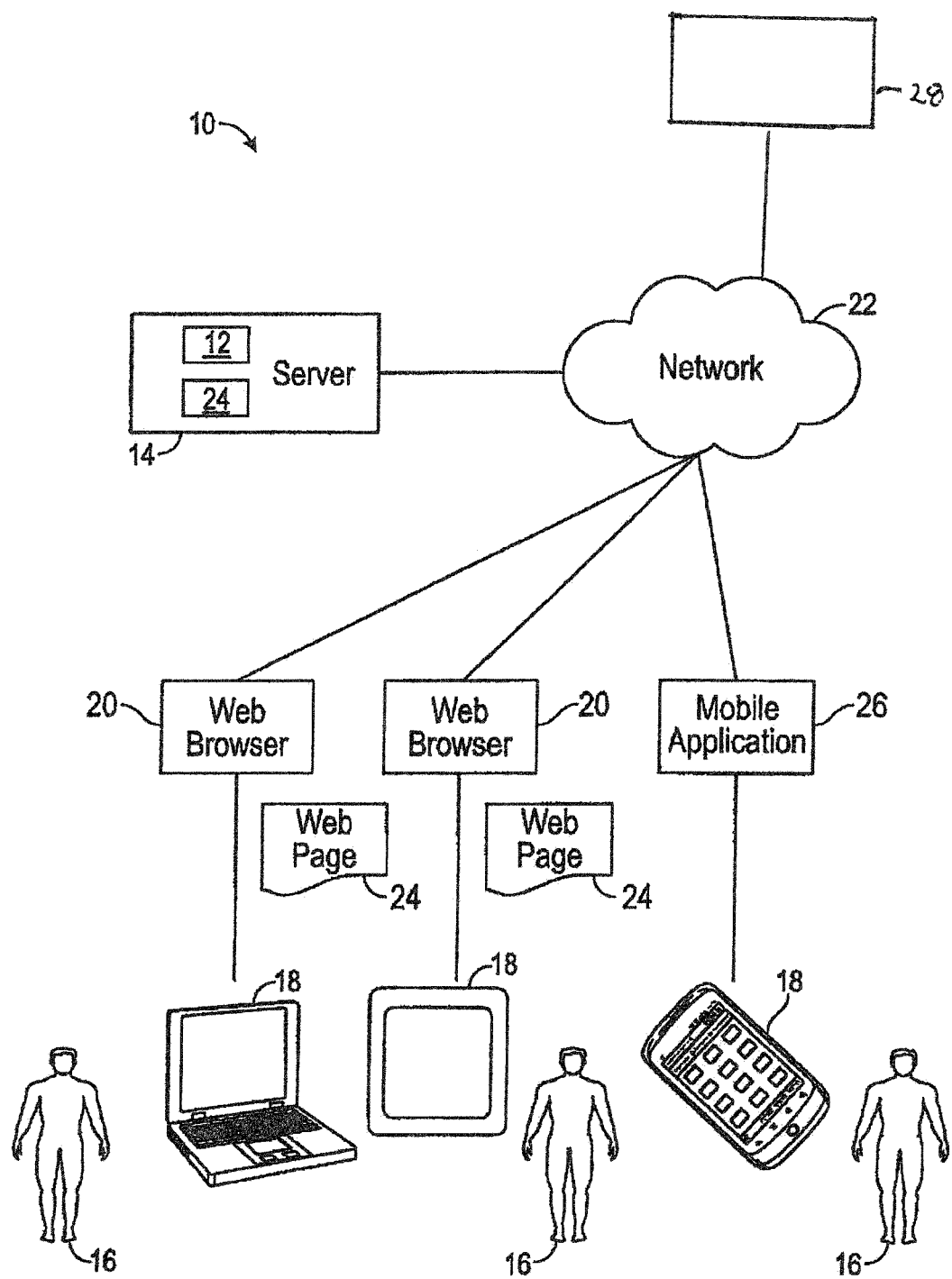
FIG. 1 is a block diagram of an exemplary embodiment of a network system to allow one to access a dynamic allocation and resource management system according to one aspect of the present application.

Referring now to FIG. 1, a system 10 may be shown. The system 10 may allow one to access a dynamic allocation and resource management system 28. The dynamic allocation and resource management system 28 may be used for cloud workers and may keep required servers up and enabled only when needed, saving users money on server rentals during off hours, as well as other features that may be described below.

The system 10 may have a server 14. The server 14 may be used to host a platform 12. The platform 12 may allow one to access the dynamic allocation and resource management system 28 of the present invention. Individuals 16 may use one or more computing devices 18 to access the platform 12 that may be hosted on the server 14. The computing devices 18 may be a personal computer system, tablet device, handheld or laptop device, mobile phone device, server computer system, multiprocessor system, microprocessor-based system, set top boxes, programmable consumer electronics, network PCs, and distributed cloud computing environments that include any of the above systems or devices, and the like. The computing device 18 may be described in the general context of computer system executable instructions, such as program modules, being executed by a computer system as may be described below.

The computing device 18 may be loaded with an operating system. The operating system of the computing device 18 may manage hardware and software resources of the computing device 18 and provide common services for computer programs running on the computing device 18. The computing device 18 may be loaded with a browser 20. The browser 20 may allow the computing device 18 to gain access to a network 22 such as a Local Area Network (LAN), a Wide Area Network (WAN) or similar type of networks. The browser 20 may be a commercially available web browser Microsoft® Internet Explorer, Google® Chrome, Mozilla® Firefox, Apple® Safari, similar browsing applications, a remote network access software, or similar types of software for connecting to a network. By connecting to the network 22, the computing device 18 may access a webpage 24 associated with the platform 12 hosted on the server 14 thereby gaining access to use the dynamic allocation and resource management system 28.

Alternatively, or in addition to, the computing device 18 may download a mobile application 26. The mobile application 26 may access and communicate with the platform 12 hosted on the server 14. By connecting to the network 22, the computing device 18 may access and communicate with the platform 12 hosted on the server 14 via the mobile application 26 thereby gaining access to the dynamic allocation and resource management system 28

Figure 2:
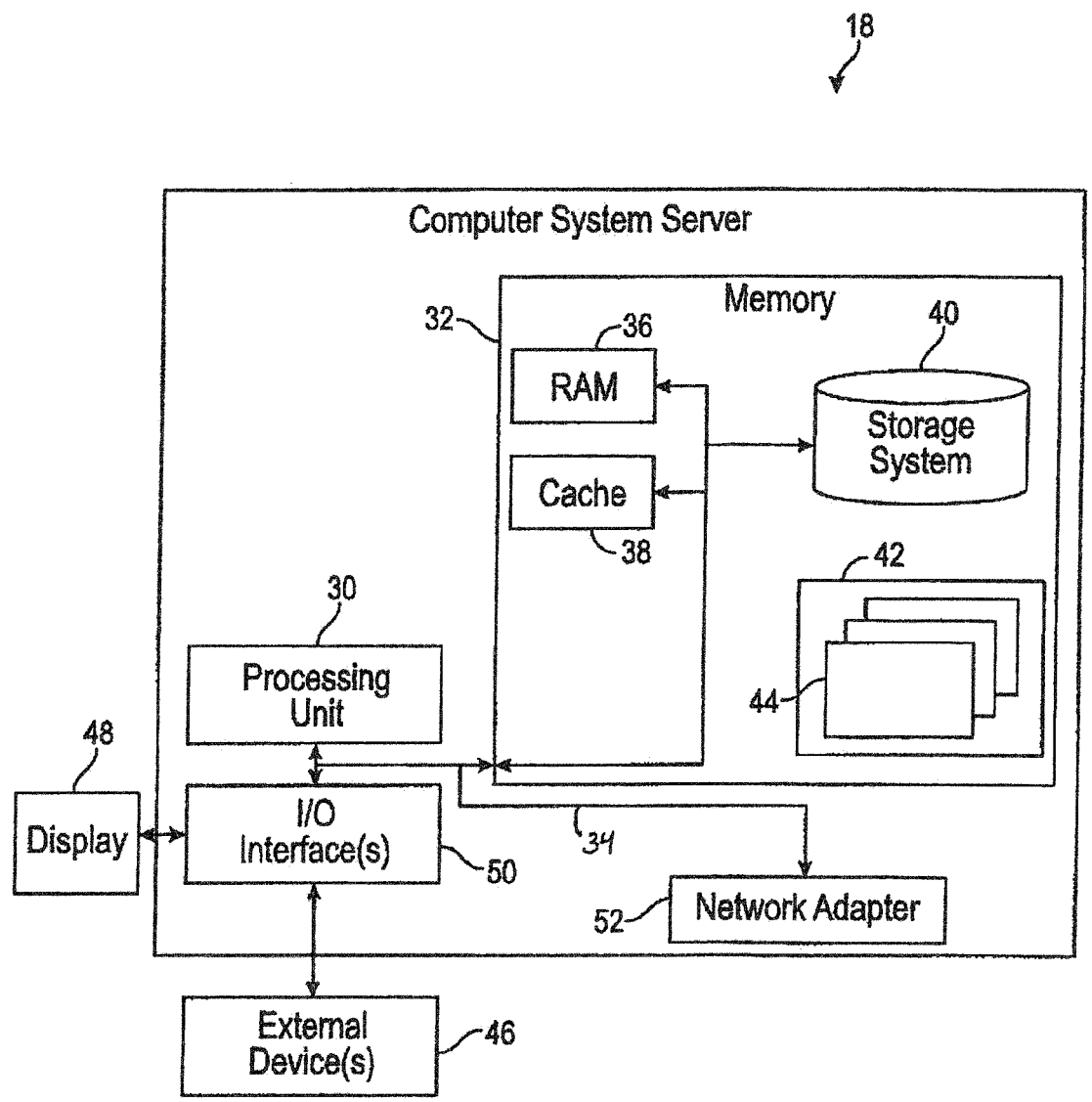
FIG. 2 is a perspective view of an exemplary embodiment of a computing device used in the network system of FIG. 1 in accordance with one embodiment of the present invention.

Referring now to FIG. 2, the server 14 and/or computing devices 18 (hereinafter computing device 18) may be described in more detail in terms of the machine elements that provide functionality to the systems and methods disclosed herein. The components of the computing devices 18 may include, but are not limited to, one or more processors or processing units 30, a system memory 32, and a system bus 34 that couples various system components including the system memory 32 to the processor 30. The computing devices 18 may typically include a variety of computer system readable media. Such media could be chosen from any available media that is accessible by the computing devices 18, including non-transitory, volatile and non-volatile media, removable and non-removable media. The system memory 32 could include one or more computer system readable media in the form of volatile memory, such as a random-access memory (RAM) 36 and/or a cache memory 38. By way of example only, a storage system 40 may be provided for reading from and writing to a non-removable, non-volatile magnetic media device typically called a "hard drive".

The system memory 32 may include at least one program product/utility 42 having a set (e.g., at least one) of program modules 44 that may be configured to carry out the functions of embodiments of the invention. The program modules 44 may include, but is not limited to, an operating system, one or more application programs, other program modules, and program data. Each of the operating systems, one or more application programs, other program modules, and program data or some combination thereof, may include an implementation of a networking environment. The program modules 44 generally carry out the functions and/or methodologies of embodiments of the invention as described herein. For example, the program modules 44 may carry out the steps for initiating an event creation, private and group communication between invitees to the event created, visual and/or textual summaries of past events of individuals and other functionality as will be described below.

The computing device 18 may communicate with one or more external devices 46 such as a keyboard, a pointing device, a display 48, and/or any similar devices (e.g., network card, modem, etc.) that enable the computing device 18 to communicate with the server 14 (FIG. 1). Such communication may occur via Input/Output (I/O) interfaces 50. Alternatively, the computing devices 18 may communicate with one or more networks such as a local area network (LAN), a general wide area network (WAN), and/or a public network (e.g., the network 24 shown in FIG. 1) via a network adapter 52. As depicted, the network adapter 52 may communicate with the other components of the computing device 18 via the bus 36.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, aspects of the disclosed invention may take the form of a computer program product embodied in one or more computer readable media having computer readable program code embodied thereon.

Any combination of one or more computer readable media (for example, storage system 40) may be utilized. In the context of this disclosure, a computer readable storage medium may be any tangible or non-transitory medium that can contain, or store a program (for example, the program product 42) for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing.

Figure 3:
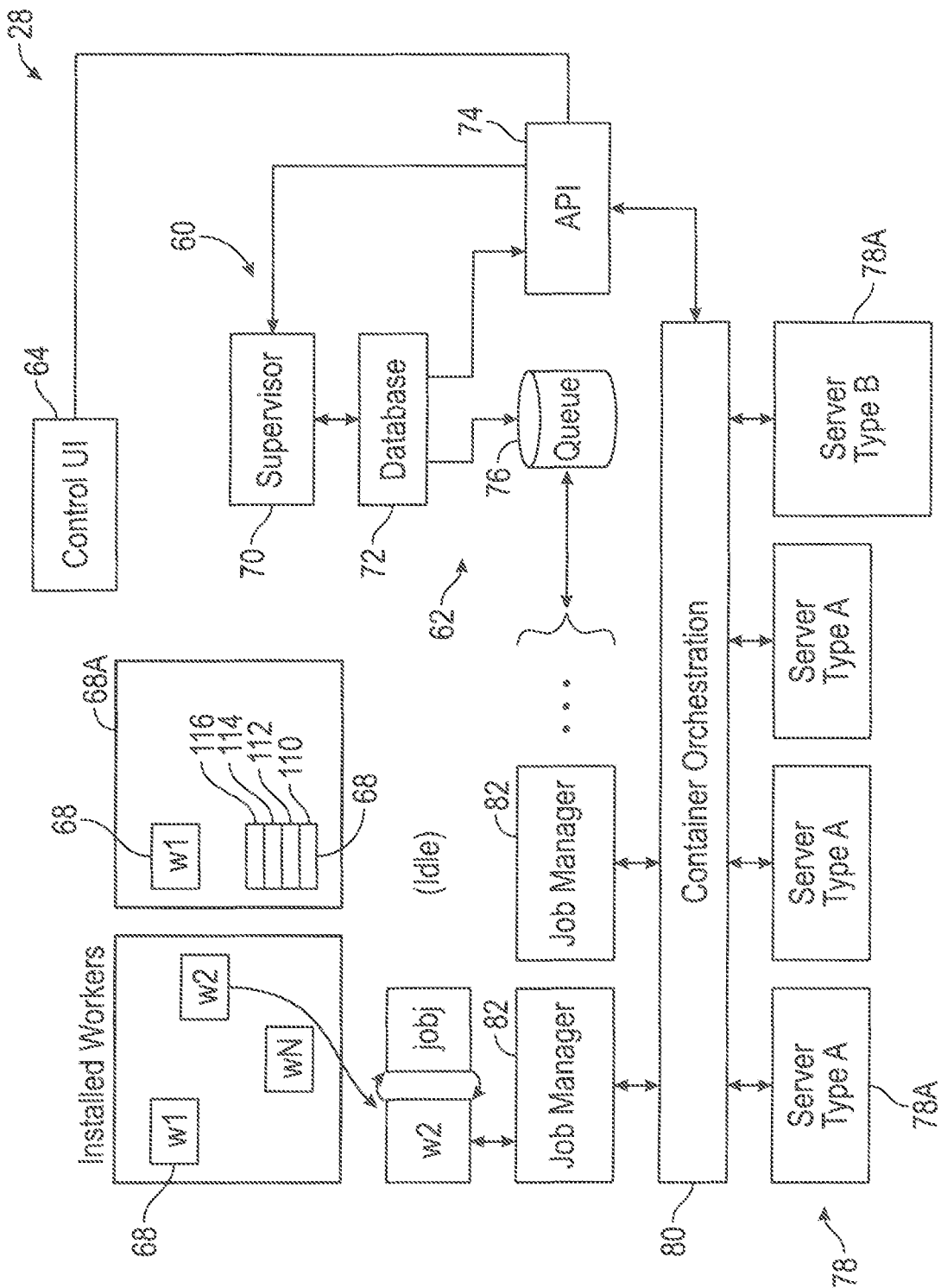
FIG. 3 is an exemplary embodiment of a dynamic allocation and resource management system of FIG. 1 according to one aspect of the present application.

Referring to FIG. 3, a functional block diagram of the dynamic allocation and resource management system 28 (hereinafter management system 28) for cloud workers may be seen. While the management system 28 may be seen as a separate block, components of the management system 28 may be part of the platform 12.

As shown in FIG. 3, the management system 28 may be formed of a worker management unit 60 which uses worker optimization, a request handling unit 62, and a user interface 64. The worker management unit 60 may consist of a worker pool 68A of cloud workers 68 and a supervisor 70. The worker pool 68A may be a dynamically sized group of deployed cloud workers 68. Cloud workers 68 in the worker pool 68A may be idle if they are available to process a job, or busy if they are currently processing another job. Available workers can be assigned a job by the supervisor 70.

The cloud workers 68 may be compartmentalized or containerized software programs that may perform a specific task. These tasks may be document data extraction, image processing, compression, video rendering, speech-to-text conversion, machine learning predictions, and similar processes. The cloud workers 68 may have Virtual Private Network (VPN) configurations in order to connect to single or multiple VPNs to secure data transmissions and allowing the management system 28 to be used for sensitive and critical data and applications. Cloud workers 68 may generally be deployed on servers 78A via Virtual Machines (VM). Such deployment may require servers to be purchased or rented. This may result in server cost for times the cloud worker may be idling. The management system 28 may optimize when the servers 78A are active. The management system 28 may distribute servers 78A across multiple cloud workers 68 which may optimize the net server utilization and effectiveness. Cloud workers 68 may either be a containerized command line executable, or programs using pre-defined templates with entry points in supported common languages, such as Python, JavaScript, Node.JS, or the like. [MI] Cloud workers 68 may be designed to pull tasks off a queue or on demand. Each of the cloud workers 68 may be compiled/augmented with the necessary backend functionality to properly and securely communicate with the request handling unit 62. The request handling unit 62 may consists of a database 72 with cloud worker statuses, and job details, and a worker dispatch API 74 in a "dispatch" model architecture, and/or a job queue 76 in a "volunteer" model architecture as will be disclosed below.

The user interface 64 may allow users the ability to view and edit job statutes, track jobs, monitor status and load of each cloud workers 68 as well as other operating parameters, set and change rules for cloud worker 68 and server deployments, and perform analytics on job results. The user interface 64 may allow users to view uptime and downtimes for the cloud workers 68 and the amount of resources allocated currently and in the past. The user interface 64 may allow users to view worker optimization statistics. If the user 16 provides extra checkpoint data for optimization via the standardized callbacks in the cloud worker 68, artificial intelligence can use this information as further assistance while it learns. The user interface 64 may allow users to test cloud workers 68 in an isolated environment and view the processing in real time as well as outputs prior to production.

The management system 28 may standardize job data structures to include required information for tracking, and optimization. Standardized job data structures allow the worker optimizer to be trained on inputs and outputs regardless of worker tasks. The standardize job data structure may be passed in various different formats such as Extensible Markup Language (XML), JavaScript Object Notation (JSON), Binary JSON (BSON), raw text file, or any data transmission protocol. The standardize job structure may use the provided specification below, with the following variables:

Universally Unique Identifier (UUID) job identifier used to track jobs.

Cloud Worker Identifier—unique identifier used to select the cloud worker (type) to be used to process the job.

Input Data—job input as a serializable object, may include numeric values, strings, string-encoded binary data, arrays, lists, dictionaries, and similar information.

Job Result/Error message—result of the completed job as a serializable object, with similar requirements and format specifications as the input data if the job was successfully completed. This object contains an error message if the job failed.

Job Status—A variable identifying job status by Stratum—can be a variable representing one of Queued, Working, Error, Success, Killed or similar job status information.

Progress—A numeric floating-point value identifying progress (0 to 100%, 0 to 1.0 or similar progress values).

Log Data—a list of timestamps associated with string messages passed by the cloud worker for tracking, and debugging.

Manual Kill Requested—a Boolean (True/False) variable that indicates whether a user or customer application has manually requested killing the job.

Requested Timestamp—the date and time the job has been requested by an API request.

Start Timestamp—the date and time the job has been started by a cloud worker.

End Timestamp—the date and time the job was either killed, completed, timed-out, or failed.

Worker Instance Identifier—unique identifier associated with the specific instance of a cloud worker that performed this task.

Optional Hook Parameters—an optional endpoint to make an API request either when the job is completed, or if the job fails. For example, this may be a web-hook URL to a customer's API that is to be notified with the job result when the job is complete, or error logs if the job fails or times out.

A job may be initiated by an API request made by an authorized customer application. The management system 28 either dispatches a cloud worker 68 immediately in the "dispatch" model architecture, or adds the job to a queue in the "volunteer" model architecture. The dispatch API 74 may respond with a Universally Unique IDentifier (UUID) that allows users to track the job status, and retrieve results on completion.

Cloud workers 68 may be containerized in order to isolate the working environment and perform tasks predictably on different servers 78A with different hardware configurations. Cloud workers 68 may be augmented/compiled with standard software to allow secure interactions with components of the management system 28.

The management system 28 may use a server infrastructure 78. The server infrastructure 78 may consist of one or more servers 78A either deployed on dedicated or shared machines, or through server providers which are charged based on server up times as opposed to daily, monthly, or annual rentals. The worker pool 68A may be distributed over the servers 78A.

A container orchestration platform 80 may be layered over the servers 78A. The container orchestration platform 80 may manage server resources dynamically. The container orchestration platform 80 may provide an interface between the supervisor 70 and the worker pool 68A. The supervisor 70 may use the container orchestration platform's API to perform server operations. Pool workers 68A having a plurality of cloud workers 68 augmented with job managers 82 run on top of the container orchestration platform 80 to perform jobs.

The supervisor 70 may dynamically allocate and manages server deployments and operations in order to ensure optimal performance and maximized cost savings. The supervisor 70 may manage the worker pool 68A by dynamically, creating, deleting, shifting, turning on, and shutting off resources according to past trends, current demands, and user preferences/rules in order to maximize user savings. The supervisor 70 may use the dispatch API 74 to the container orchestration platform 80 in order to command various server resource operations. The supervisor 70 may group standby cloud workers 68 for multiple customers into a single or small number of servers 78A in order to minimize the total number of servers 78A on standby at a given point in time, and to maximize server utilization and efficiency. The supervisor 70 may communicates with the bot status database, and the job queue database in order to extract past trends, and current demands.

Figure 4:
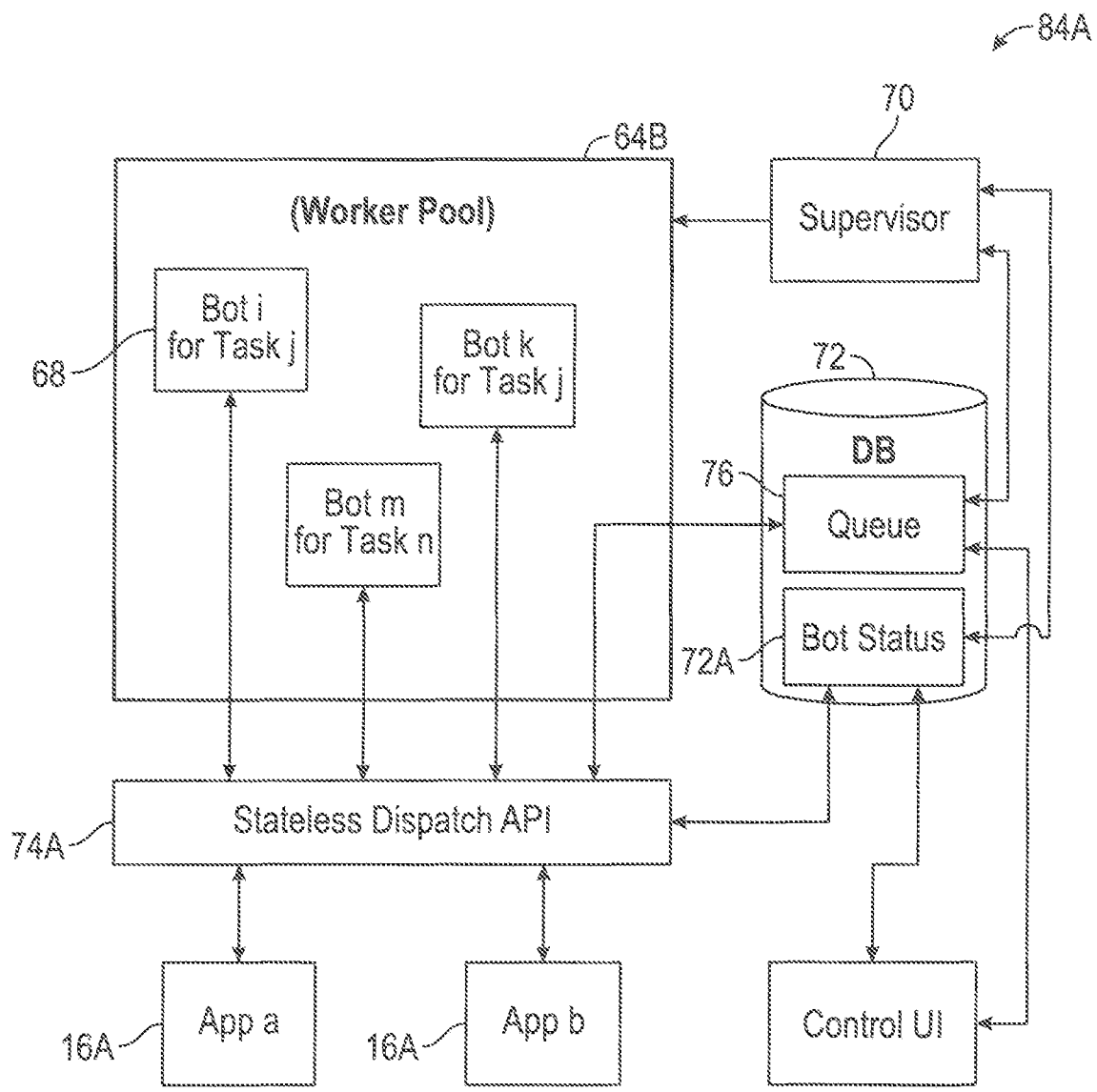
FIG. 4 is an exemplary embodiment of a dispatch API used in the dynamic allocation and resource management system of FIG. 3 according to one aspect of the present application.

Referring to FIG. 4, one embodiment of a dispatch module 84A may be seen. In the dispatch module 84A, the dispatch API 74 may be a stateless dispatch API 74A in the request handling unit 62. The stateless dispatch API 74A may be an Application Programming Interface (API) that allow user applications to request/queue jobs, track their status, and either retrieve results for completed jobs, or error logs for failed jobs.

In the dispatch module 84A, cloud workers 68 may be deployed and managed dynamically onto the worker pool 68A by the supervisor 70. The stateless dispatch API 74A may be used as a centralized broker between user applications and the worker pool 68A. When operating under the dispatch module 84A, the stateless dispatch API 74A may accept authorized incoming requests from customers' applications 16A. The stateless dispatch API 74A may create a job data structure object with the provided input to the job queue 76, and queries the bot status database 72A for available cloud workers 68. The hot status database 72A may be a table or collection of documents which tracks job requests made, progress, status, inputs, results, and times. The unique job identifier may be returned to the customer application 16A. If a cloud worker 68 is available, the stateless dispatch API 74A may forward the job request to the available cloud worker 68.

If a cloud worker 68 is not available, the stateless dispatch API 72A may add the job to the job queue 76. If the number of jobs in the job queue 76 is higher than a threshold, the job cue 76 may signal to the supervisor 70 to dispatch new cloud workers 68. The threshold value may be calculated based on the average job processing times, user preferences, and current demand. Thus, the job request may be queued for either when the cloud worker 68 is freed from a previous job, or until the supervisor 70 deploys additional cloud workers 68.

Figure 5:
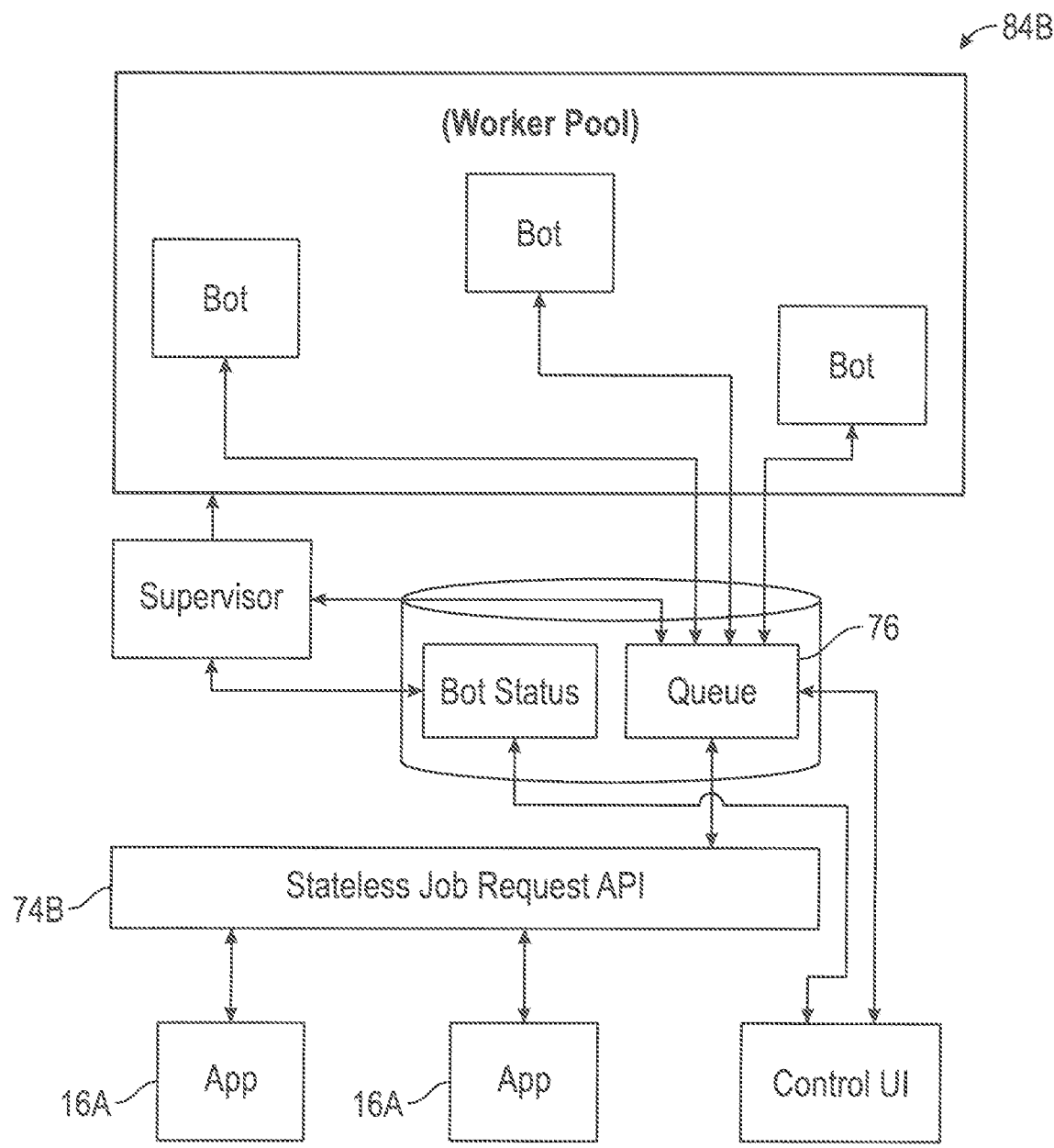
FIG. 5 is an exemplary embodiment of a job request API used in the dynamic allocation and resource management system of FIG. 3 according to one aspect of the present application.

Referring to FIG. 5, a dispatch module 84B may be seen. The dispatch module 84B may be operating as a volunteer model architecture. In this implementation the dispatch API 74 may be a stateless job request handling API 74B. The stateless job request handling API 74B main task is to provide an interface between the application and the job queue 76. Cloud workers 68 may be deployed and managed dynamically onto the worker pool 68B by the supervisor 70 similar to when implemented using the dispatch model architecture.

When operating using the volunteer model architecture, the stateless job request handling API 74B may be used to interface between customer applications 16A and the job queue 76. The stateless job request handling API 74B may be used as the request handling unit where user applications 16A may send API requests through any means (HTTP/HTTPS GET/POST requests, libraries/packages for specific languages, etc.).

When a customer application 16A makes an authorized API request, a job data structure object with the provided input may be created in the job queue 76. The stateless job request handling API 74B may schedule the job onto the job queue 76. The stateless job request handling API 74 may return a job UUID to the user application 16A, which the user application 16A can use to track and retrieve job results. The stateless job request handling API 74B may be an Application Programming Interface (API) that allow the user applications 16A to request/queue jobs, track their status, and either retrieve results for completed jobs, error logs for failed jobs or a timeout.

In the above embodiments, the job queue 76 may be a message broker, database that tracks each job request as a table entry for tabular databases, or document in collection for document-based databases. The job queue 76 may be used to add new jobs requested by the user. The job queue 76 may be polled by cloud workers 68 in the volunteer model atomically to retrieve an available job for the cloud worker 68. The job queue 76 may be updated by the cloud workers 68 with status/progress updates, errors logs, and results upon job completion. The job queue 76 maintains job entries even after completion to track jobs and operational statistics. The job queue 76 may be minimized to contain only input/output and time data for archival in order to save on storage costs for the database server. Job data may also be exported from the active job queue 76 to separate low-cost archival databases.

In order to allow customers to develop cloud workers 68 to function on the management system 28 and in a wide range of languages, the cloud worker 68 should be able to be executed on a containerized environment such as Docker®. Containerization generally involves bundling the cloud worker 68 together with all of its related configuration files, libraries and dependencies required for it to run in an efficient and bug-free way across different computing environments.

Containers may be compared to Virtual Machines (VMs), since both of them may allow multiple types of software to be run in contained environments. Containers may be an abstraction of the application layer (meaning that each container simulates a different software application). Though each container may run isolated processes, multiple containers may share a common Operating System. Using containers, isolated environments can be emulated for various operating systems including Microsoft Windows, Mac OS X, Linux, as well as other operating systems.

The container executable may accept a command line argument as a string variable. If JavaScript Object Notation (JSON) is used for the job data structure, the entire input variable may be serialized into a raw or encoded string, and passed in to the executable. The executable shall communicate to the job tracking database 72 or queue 76 by printing the result to the process pipe. The print outputs may be one of the following:

Job result if succeeded
Job status update
Job error if failed

A header and/or footer may be used to distinguish the output types.

The container executable may also create output files in the containerized environment file system to communicate larger data objects such as images, videos, numerical data, text data, etc.

The augmented job manager 82 may call the container executable as a monitored sub-process with set timeouts, and error handling with the provided input data structure. The augmented job manager 82 may read string status updates printed to the sub-process pipe by the container executable and post the updates to the job database 72. The augmented job manager 82 may read either the job results upon successful completion or the error message in case of failure, and update the job database 72.

In order for the cloud worker 68 to communicate with the management system 28, for specific common languages, project templates may be provided. The templates may allow cloud workers 68 to communicate with the standardized job management interface. The project template may contain the following files:

Entry point 110—the main file which contains a function or subroutine which is executed by the specific cloud worker's job manager 82. This file can include or import other custom source files within the project directory, or other third-party libraries which may be used in the project.

Environment definition file 112—a file that includes specific details about the isolated and containerized environment to be used (for example, a Dockerfile file). This file describes the environment operating system, image, and/or any dependency installation scripts necessary to run the cloud worker.

Environment variables file 114—a file that contains a set of default environment variables to be initialized. Environment variables can include sensitive information such as IP addresses, secure access keys, etc. which are not to be tracked by the project management repository.

Virtual Private Network (VPN) configuration file 116— file that connects the cloud worker 68 to a specific VPN in order to allow secure transmission of sensitive information.

The entry file of the cloud worker 68 may contain a main function or subroutine template which includes the serializable job input as a functional input argument, and serializable job result or error message as the return variable. The main function or subroutine template shall also have an input argument to a synchronous or asynchronous callback function which allows the following functions from within the cloud worker 68:

Automatically record the date and time of every action.
Pause and/or kill a cloud worker 68 at any given time.
Update status and progress to the job management system.
Log errors or internal statuses for later use by the customer or operator of the management system 28.
Log or send any collectible and serializable data of cloud worker status or parameters, at any given time to be used as metrics, loss coefficients, or optimization variables for artificial intelligence and machine learning optimization.

In the management system 28, resource allocation may be constantly monitored for use in the future to predict when more or less resources may be needed. The supervisor 70 may deploy and stop cloud workers 68 in anticipation of future demand in an attempt to avoid any need for adjustments in real time. When abnormally high or low cloud worker traffic may occur, the supervisor 70 may adjust the size of the worker pool 68A to meet demand in real time efficiently.

When a supervisor 70 for a cloud worker 68 has been active long enough, artificial intelligence, and predictive modeling methods may be used by the supervisor 70 to increase the accuracy of the supervisor's future predictive power. For customers that are new to the management system 28 and for whom sufficient data has not yet been collected, either predefined settings, predictions based on average usage of all customers combined, or schedules designed specifically to gather usage data may be used until sufficient data is collected.

The supervisor 70 may have an AI module that may use past data from deployed cloud workers 68 to determine how to scale resources for those cloud workers 68 in the future. In accordance with one embodiment, the AI module of the supervisor 70 may work as follows. A user 16 may create a task that start by relying on generic scaling algorithms. The user 16 may set rules for tasks such as minimum number of reserved servers, estimated average run time as well as other task rules. The set of rules may be entered using the user interface 64. The user 16 may set operation parameters such as the number of servers 78A, time of operation, day of operation, weekday vs weekend as well as other similar parameters. The operation parameters may be entered using the user interface 64. The AI module of the supervisor 70 may track worker utilization for that task based on actual run time, request volumes and the like. Based on the worker utilization, the AI module may identify usage patterns includes days of the week, hours of the day, occurrence of special event days as well as other usage patterns.

The AI module may use tracked worker utilization to created AI models to predict the future changes in worker utilization. Users 16 may view what these models predict and compare them against what the default algorithm may display/predict. The supervisor 70 may uses the AI models to optimize server up and down times, and scaling. In accordance with one embodiment, the supervisor 70 may use the AI models if authorized by the user 16

Standardized inputs for specific tasks may allow networks to be trained to predict output for tasks which require high computing power, cutting down processing time and resources dramatically. Input data types may include any text, numeric, or Boolean key-value pair along with images and videos.

After a sufficient number of jobs have been processed, users 16 may enable AI Worker Optimization of the AI module to have Machine Learning methods learn based on tens of thousands of job inputs and outputs. These AI Worker Optimizers can perform workers tasks with accuracy at fractions of the speed.

In accordance with one embodiment, the user 16 may create a task and start using the management system 28 to automate scaling of that task. Tasks may contain a set of standardized inputs and outputs (Strings, Floats, integers, arrays (images), etc.). The management system may use those inputs and output over many jobs run by users 16 to generate appropriate AI models to predict outputs to the tasks users have defined. The management system 28 may optimize the AI models for parameters such as numeric or classification accuracy to match the task output. The management system 28 may automatically train the AI models when new jobs have been completed by manual task. When a threshold match accuracy may be achieved, users 16 may opt to use the AI model which is expected to run in a fraction of a second vs the original task which could take a lot longer.

The management system 28 may allow users to specify parameters or rules which may force the supervisor 70 to operate in a specific fashion, or provide guidance to the supervisor 70 in order to select times of operation, numbers of workers or similar operating parameter. These may include, but are not limited to:

Minimum number of active cloud workers to be on standby for request handling.

Maximum number of active cloud workers at any given time or range of times.

Timeouts for cloud workers to report jobs as failed/hung.

Maximum amount of time a job can wait on the queue before it has been processed.

Adjusting the degree to which predictive features are used to manage the worker pool when using machine learning and artificial intelligence to optimize workers.

Figure 6:
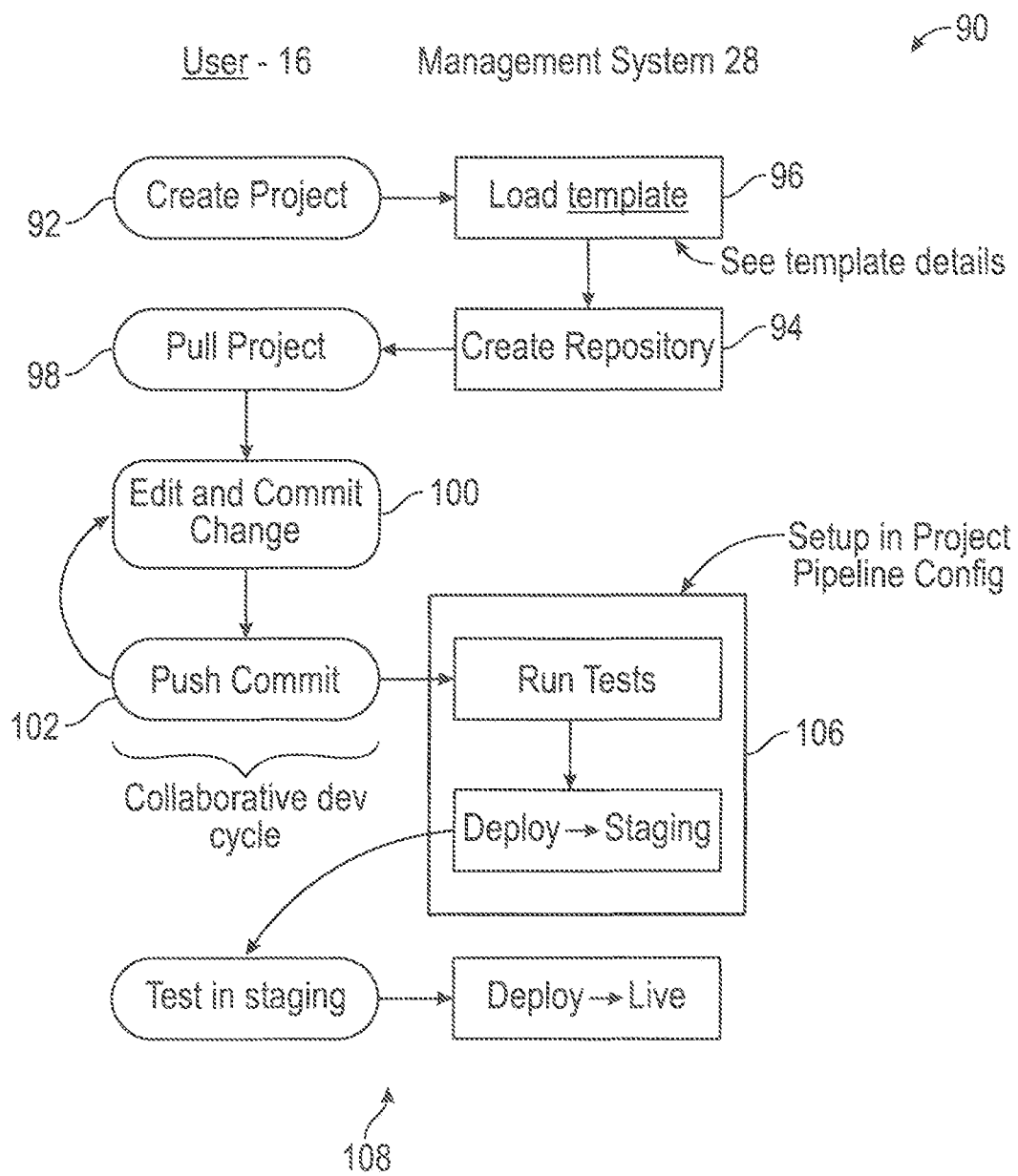
FIG. 6 is an exemplary workflow for cloud worker creation used in the dynamic allocation and resource management system of FIG. 3 according to one aspect of the present application.

Referring to FIG. 6, a workflow 90 for cloud worker creation, testing, and deployment may be seen. In the workflow 90, a user 16 may create a cloud worker 68 as shown in 92. The user 16 may either upload a compressed archive/directory of the project root folder, or passes an online repository URL where the project is hosted to the cloud worker creation utility/wizard as shown in 94. The cloud worker creation utility/wizard may be a web-based application, a local Graphical User Interface (GUI) application that runs on an operating system, or a set of commands to be run on the command line, terminal, or command prompt.

In case of a containerized executable, the user 16 creates a configuration file for the container system (for example, a Dockerfile file for Docker containers) which installs/prepares the isolated runtime environment, and any dependencies.

In case the customer uses a cloud worker template for one of many common languages provided by the management system 28, the user 16 may build their cloud worker 68 around a template. The template may be initialized by a command line argument or downloaded from a file hosting service. The customer or its affiliates program the cloud worker functionality into this template. The user 16 may then upload the project built around the template to the management system 28 as shown in 96.

The user 16 may at any time edit the cloud worker 68. As shown in the workflow 90, the user 16 may pull the cloud worker 68 form the management system 28 as shown in 98. The user 16 may edit and make any changes to the cloud worker 68 as may be seen in 100. Once any changes have been made, the cloud worker 68 may be pushed back to the management system 68 as may be seen in 102.

Cloud workers 68 developed by clients should have a standardized input and output. Inputs and outputs can be of the following formats:

Text (strings)

Numbers (Integers, floats, doubles, and special type numerical values for example, 8-bit unsigned integers, 32-bit signed integers, etc.)

Images (N-Dimensional matrices of numbers)

Lists of data types

Dictionaries/objects of data types

Or any serializable object data types.

Once created by a client, isolated testing environments for testing of the cloud worker 68 developed may be deployed as may be seen in 106. The testing may be deployed by customers for limited periods of time while running specific tests used in the development operations (DevOps) cycle— for example, regression testing. The production/live environment may also be used to test performance of the developed cloud worker 68 as shown in 108.

The user interface 64 may allow users 16 to provide a set of predefined inputs and outputs to run tests periodically as per a given schedule, or upon cloud worker updates. The user interface 64 may allow users 16 to set custom input variables, or drag and drop data files to send to cloud workers 68 to perform jobs on demand for testing purposes. The user interface 64 may also allow users 16 to input ranges of data, or upload bulk data files.

The components of the management system 28 may work together to perform the overall tasks, and optimize server runtimes. The various workflows associated with customers using the management system 28 may include, but are not limited to:

Customers can create cloud workers 68 using the user interface 64.

Customers can test cloud workers 68 using a predefined set of inputs and comparison outputs.

Customers can deploy cloud workers 68 onto servers 78A with preset rules using the user interface 64.

Other applications can use HTTP/HTTPS GET/POST requests or any other API methods to send job requests for cloud workers 68. The applications can then track job progress/status, and retrieve results or error logs.

Artificial Intelligence can and may also be used to optimize cloud worker 68 performance.

When a request may be made for a cloud worker 68 to be deployed to the worker pool 68A, a signal is sent to the supervisor 70 to dispatch cloud workers 68 as needed. Cloud workers 68 can be updated while retaining past data if the input and output formats are consistent between updates.

Once a cloud worker 68 is deployed, users 16 may send job requests through the dispatch API 74. The job request may be sent via the stateless job request API 74B in the volunteer model, or via the stateless job dispatch API 74A in the dispatch model. The API request should include the unique cloud worker identifier and the input data structure object to be passed to the cloud worker 68. Other operating parameter may also be passed to the cloud worker 68.

The API 74 will communicate with the job queue 76 and provide the unique job identifier (UUID) to the user 16, along with cloud worker 68 availability data, and job status. The job managers 82 augmented to cloud workers 68 accept jobs from the job queue 76, and call the main function or subroutine within the entry file, or the executable with the provided input arguments, to execute the job. Job status and progress updates are updated in the job queue 76, which may be requested by customer applications, or viewed through the user interface. Upon successful completion of a job, the results are posted to the job queue 76. The user may retrieve the job results through either the stateless job request handling API 74B, or the stateless dispatch API 74A depending on the model.

In case of a job failure or a timeout, either due to errors in the cloud worker 68, unexpected circumstances, bad inputs, etc., the cloud worker 68 may terminate the job and reset to accept a new job. The error logs may then be posted to the job queue 76. When the customer application requests an update or the job results, the error logs should be provided. The error logs may also be used and tracked to assist in debugging, and improving the cloud workers 68.

Users 16 can easily track and manage their active, completed, and pending jobs through the user interface 64, or through the job request or dispatch API 74.

Jobs can be paused, resumed, unqueued, or killed at any time.

Analytics of information received from the cloud worker callback may be browsed.

Simple sort and search functions to find jobs which match any subset of the above criteria.

The foregoing description is illustrative of particular embodiments of the application, but is not meant to be a limitation upon the practice thereof. The following claims, including all equivalents thereof, are intended to define the scope of the application.

What is claimed is:

1. A cloud worker management system comprising:
   one or more processors;
   a worker management unit executing on the one or more processors configured to manage a plurality of cloud workers, the worker management unit dynamically allocating and manage deployment of the cloud workers to a plurality of servers;
   a request handling unit executing on the one or more processors configured to communicate with the worker management unit, the request handling unit receiving job request, creating a standardized job data structure object for the job request and forwarding the job request with the standardized job data structure object to an available cloud worker; and
   a user display configured to allow users of the system to view and edit job statutes; track jobs; monitor status, load and operating parameters of each cloud worker; set and change rules for cloud worker and server deployments, and perform analytics on job results.

2. The system in accordance with claim 1, wherein the user interface allowing the users to view uptime and downtimes for the cloud workers and cloud worker optimization statistics.

3. The system in accordance with claim 1, wherein the user interface allowing the users to test cloud workers in an isolated environment, view processing in real time and outputs prior to production.

4. The system in accordance with claim 1, wherein the standardized job data structure object is in a format of one of: Extensible Markup Language (XML), JavaScript Object Notation (JSON), Binary JSON (BSON), raw text file, or any standardized data transmission protocol.

5. The system in accordance with claim 1, wherein the standardized job data structure comprises a Universally Unique Identifier (UUID) to track jobs, a cloud worker identifier, job input data, job result/error message, job status, and progress.

6. The system in accordance with claim 5, wherein the standardized job data structure comprises log data having a list of timestamps associated with string messages passed by the cloud worker for tracking, and debugging, a manual kill request, requested timestamp when the job has been requested, and start timestamp when the job has been started.

7. The system in accordance with claim 5, wherein the request handling unit responds to the job request with a UUID to track the job status.

8. The system in accordance with claim 1, wherein the worker management unit comprises:
   the plurality of cloud workers; and
   a supervisor, the managing a plurality of cloud workers, the worker management unit dynamically allocating and manage deployment of the cloud workers to a plurality of servers.

9. The system in accordance with claim 8, wherein the supervisor dispatches new cloud workers when a number of job request in the job queue is higher than a threshold value.

10. The system in accordance with claim 8, wherein the supervisor tracks usage patterns and server utilization to generate AI models.

11. The system in accordance with claim 10, wherein the supervisor uses the AI models to allocate and manage deployment of the cloud workers to a plurality of servers.

12. The system in accordance with claim 10, wherein the supervisor compares operation of the job request from a base scaling algorithmic to the generated AI models.

13. The system in accordance with claim 8, wherein the supervisor tracks the standardized job data structure over a predefined number of job request to generate AI models.

14. The system in accordance with claim 13, wherein the system optimizes the AI models to match the job request output.

15. The system in accordance with claim 1, wherein the request handling unit comprises:
   a database; and
   an application programming interface (API).

16. The system in accordance with claim 15, wherein the database stores cloud worker status and job details.

17. The system in accordance with claim 1, wherein the request handling unit operates in a dispatch mode, the request handling unit comprising:
   a stateless dispatch application programming interface (API) creating the standardized job data structure object for the job request and forwarding the job request with the standardized job data structure object to an available cloud worker; and
   a bot status database storing job request data and job progress data;
   wherein the stateless dispatch API queries the bot status database for an available cloud worker and forwards the job request to the available cloud worker, the stateless dispatch API adding the job request to a job queue if there are no available cloud workers.

18. The system in accordance with claim 1, wherein the request handling unit operates in a volunteer mode, the request handling unit comprising:
   a stateless job request handling application programming interface (API) creating the standardized job data structure object for the job request, scheduling the job request into a job queue, and sending a job Universally Unique Identifier UUID to a user application sending the job request; and the job queue storing the job request, wherein the job queue is polled by the plurality of cloud workers to retrieve an available job.

19. The system in accordance with claim 18, wherein the job queue is updated by the plurality of cloud workers with status/progress updates, errors logs, and results upon job completion.

20. The system in accordance with claim 18, wherein the job queue maintains job entries even after completion to track jobs and operational statistics.

21. The system in accordance with claim 1, comprising a server infrastructure communicating with the request handling unit.

22. The system in accordance with claim 1, comprising a server infrastructure communicating with the request handling unit, wherein the server infrastructure comprises a container orchestration platform communicating with the supervisor and dynamically managing the plurality of servers.

23. The system in accordance with claim 1, wherein the each of the plurality of cloud workers are containerized.

24. The system in accordance with claim 1, wherein each of the plurality of cloud workers contains an entry point file containing a function/subroutine which is executed by a specific cloud worker's job manager, an environment definition file containing specific details about an isolated and containerized environment to be used, and environment variables file containing a set of default environment variables to be initialized.

25. The system in accordance with claim 24, wherein each of the plurality of cloud workers contains a Virtual Private Network (VPN) configuration file connecting a designated cloud worker to a specific VPN to allow secure transmission of sensitive information.

* * * * *